United States Patent
Smith et al.

(10) Patent No.: US 12,538,274 B2
(45) Date of Patent: Jan. 27, 2026

(54) EXCESS SLOT-TIME RE-FARMING

(71) Applicant: Cisco Technology, Inc., San Jose, CA (US)

(72) Inventors: Malcolm Smith, Richardson, TX (US); Brian Hart, Sunnyvale, CA (US)

(73) Assignee: Cisco Technology, Inc.

( * ) Notice: Subject to any disclaimer, the term of this patent is extended or adjusted under 35 U.S.C. 154(b) by 465 days.

(21) Appl. No.: 18/059,500

(22) Filed: Nov. 29, 2022

(65) Prior Publication Data
US 2024/0179687 A1 May 30, 2024

(51) Int. Cl.
*H04W 72/0446* (2023.01)

(52) U.S. Cl.
CPC ................ *H04W 72/0446* (2013.01)

(58) Field of Classification Search
CPC ........... H04W 72/0446; H04W 74/002; H04W 74/02; H04W 74/0808
USPC ......................................................... 370/336
See application file for complete search history.

(56) References Cited

U.S. PATENT DOCUMENTS

| | | |
|---|---|---|
| 6,188,903 B1 | 2/2001 | Gardner et al. |
| 2003/0179756 A1 | 9/2003 | Cain |
| 2013/0171999 A1 | 7/2013 | Katar et al. |
| 2017/0048853 A1 | 2/2017 | Thubert et al. |
| 2021/0075566 A1 | 3/2021 | Guo |
| 2021/0111855 A1* | 4/2021 | Verma ................ H04W 72/044 |
| 2021/0136679 A1 | 5/2021 | Verma et al. |
| 2021/0194659 A1* | 6/2021 | Sevin .................... H04L 5/0064 |
| 2021/0282161 A1* | 9/2021 | Sun ........................ H04W 72/20 |
| 2023/0319866 A1* | 10/2023 | Sedin .................... H04W 16/10 370/329 |
| 2024/0215066 A1* | 6/2024 | Yang ................. H04W 74/0816 |
| 2025/0151114 A1* | 5/2025 | Liu .................... H04W 74/0866 |

OTHER PUBLICATIONS

Notification of Transmittal of the International Search Report and Written Opinion issued in International Application No. PCT/US2023/081688 mailed Feb. 20, 2024 (14 pages).

IEEE: "MAC Sublayer Functional Description(#107)", IEEE Draft, REVMD_CL_10.FM, IEEE-SA, Piscataway, NJ USA, vol. 802. 11md drafts, No. D0.3, Sep. 7, 2017, XP068137776, retrieved from https://www.ieee802.org/11/private/Draft_Standards/11md/REVmd_Cl_10.fm.rtf on Sep. 7, 2017, Section 10.24.2.10.

* cited by examiner

*Primary Examiner* — Ayman A Abaza
*Assistant Examiner* — Abdul Aziz Santarisi
(74) *Attorney, Agent, or Firm* — Merchant & Gould P.C.

(57) ABSTRACT

Excess slot-time re-farming may be provided. A slot allocation may be received by a first Access Point (AP). Next, excess time in the slot allocation may be determined. Then wireless exchanges may be used to allocate the excess time in the slot allocation to a second AP.

20 Claims, 3 Drawing Sheets

EXCESS SLOT-TIME RE-FARMING

TECHNICAL FIELD

The present disclosure relates generally to excess slot-time re-farming.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
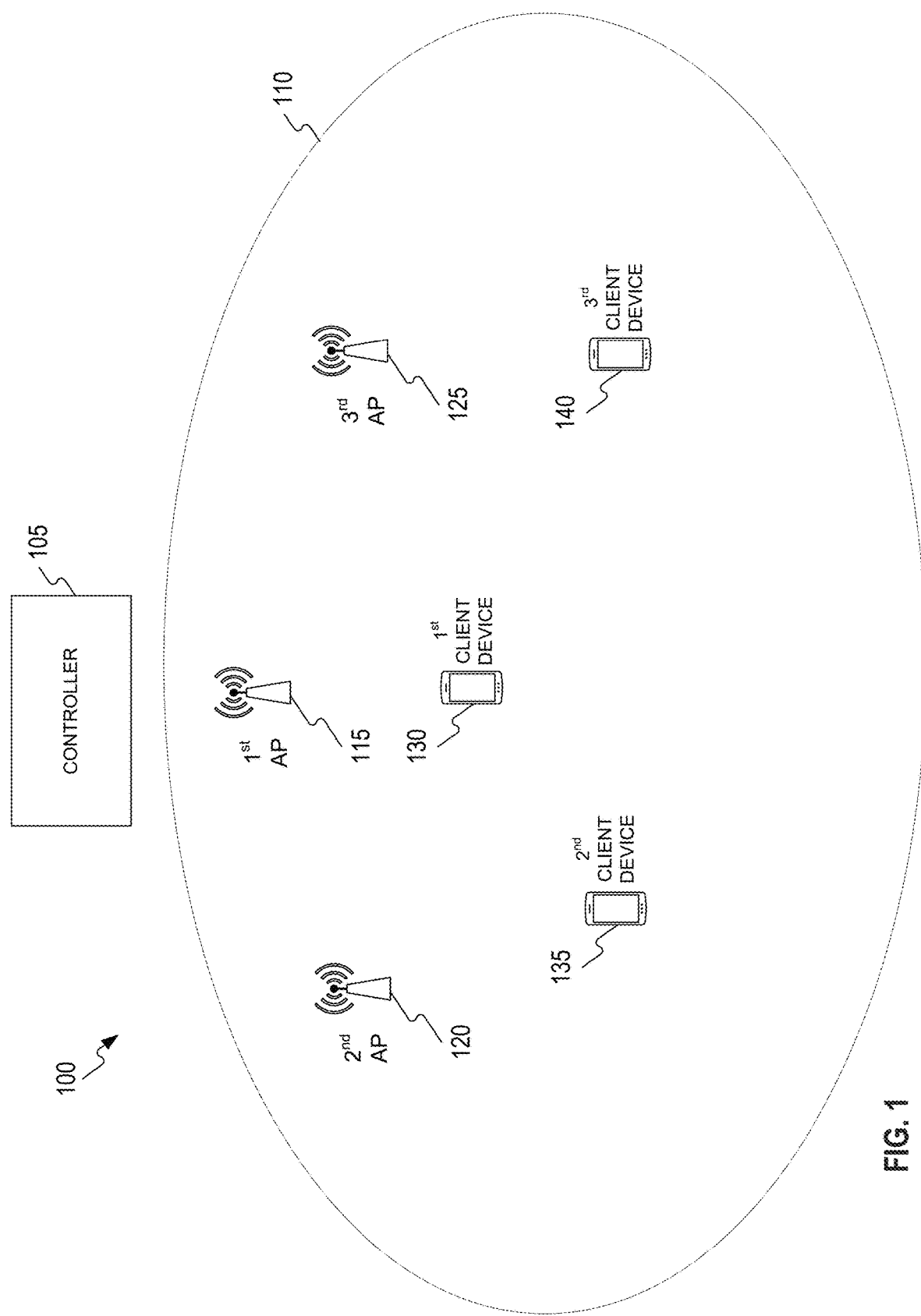
FIG. 1 is a block diagram of an operating environment for providing excess slot-time re-farming.

Excess slot-time re-farming may be provided. A slot allocation may be received by a first Access Point (AP). Next, excess time in the slot allocation may be determined. Then wireless exchanges may be used to allocate the excess time in the slot allocation to a second AP.

Both the foregoing overview and the following example embodiments are examples and explanatory only and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

With most modern media coder/decoder (codecs), especially for video, variable bit-rates may be used. While the frequencies of their corresponding flows may be predictable (e.g., 50/60 Hz), mapping to a slot-based Multi-Access Point Coordination (MAPc) scheduler may result in a regular slot sequence with a slot period of 10-20 Transmission Units (TUs) (e.g., 1 TU=1.024 ms) resulting in some unused slots (e.g., due to the time period misalignment). Thus an allocated slot may be longer than the buffered traffic, and this excess slot time should be re-farmed for efficiency.

This re-farming may be needed whether the slot-scheduler uses fixed-slots or is adaptive, or whether it is per-flow or per-slot (e.g., due to the wired latency). A basic issue may be that re-farming opportunities may be known late, so flexibility may be needed (e.g., waiting for the wired latency may take too long in some cases).

Consistent with embodiments of the disclosure, when an AP is allocated a slot for its traffic, but does not need all the resources, it may use wireless exchanges to re-farm this excess slot time. For example, embodiments of the disclosure may report the start of its excess slot to neighboring APs for them to contend for if none of their neighboring APs need the time any more. Other embodiments of the disclosure may determine if its neighboring APs have buffered traffic and allocate (e.g., some of) the remaining excess slot to one or more APs in turn (Time Division Multiple Access (TDMA)) or in parallel (Spatial Reuse (SR)) where the allocation is according to a priority of the buffer traffic.

FIG. 1 shows an operating environment 100 for providing excess slot-time re-farming. As shown in FIG. 1, operating environment 100 may comprise a controller 105 and a coverage environment 110. Coverage environment 110 may comprise, but is not limited to, a Wireless Local Area Network (WLAN) comprising a plurality of Access Points (APs) that may provide wireless network access (e.g., access to the WLAN for client devices). The plurality of APs may comprise a first AP 115, a second AP 120, a third AP 125. The plurality of APs may provide wireless network access to a plurality of client devices as they move within coverage environment 110. The plurality of client devices may comprise, but are not limited to, a first client device 130, a second client device 135, and a third client device 140. Ones of the plurality of client devices may comprise, but are not limited to, a smart phone, a personal computer, a tablet device, a mobile device, a telephone, a remote control device, a set-top box, a digital video recorder, an Internet-of-Things (IOT) device, a network computer, a router, Virtual Reality (VR)/Augmented Reality (AR) devices, or other similar microcomputer-based device. Each of the plurality of APs may be compatible with specification standards such as, but not limited to, the Institute of Electrical and Electronics Engineers (IEEE) 802.11ax specification standard for example.

Controller 105 may comprise a Wireless Local Area Network controller (WLC) and may provision and control coverage environment 110 (e.g., a WLAN). Controller 105 may allow first client device 130, second client device 135, and third client device 140 to join coverage environment 110. In some embodiments of the disclosure, controller 105 may be implemented by a Digital Network Architecture Center (DNAC) controller (i.e., a Software-Defined Network (SDN) controller) that may configure information for coverage environment 110 in order to provide excess slot-time re-farming.

The elements described above of operating environment 100 (e.g., controller 105, first AP 115, second AP 120, third AP 125, first client device 130, second client device 135, or third client device 140) may be practiced in hardware and/or in software (including firmware, resident software, microcode, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 3, the elements of operating environment 100 may be practiced in a computing device 300.

Figure 2:
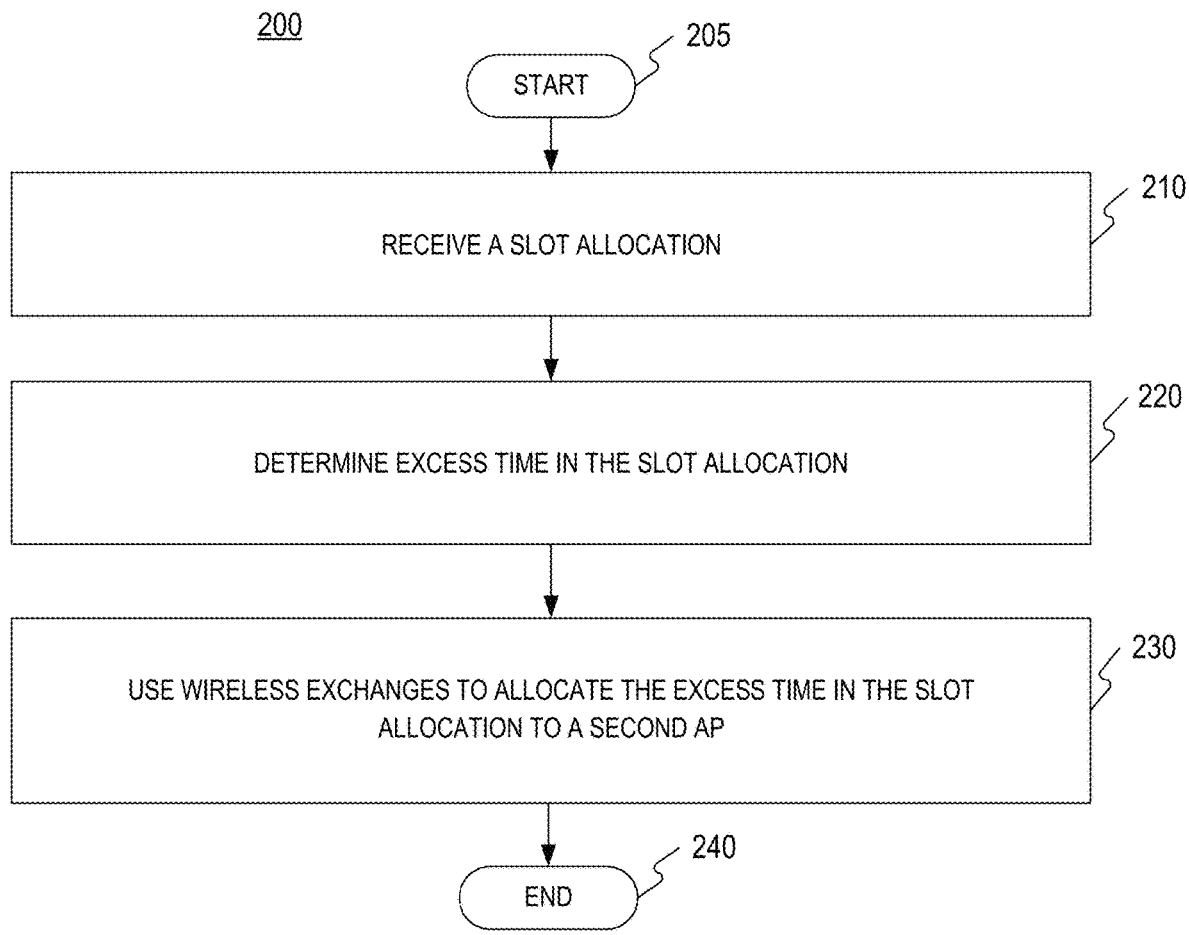
FIG. 2 is a flow chart of a method for providing excess slot-time re-farming.

FIG. 2 is a flow chart setting forth the general stages involved in a method 200 consistent with embodiments of the disclosure for providing excess slot-time re-farming. Method 200 may be implemented using a first AP 115 as described in more detail below with respect to FIG. 1. Ways to implement the stages of method 200 will be described in greater detail below.

Method 200 may begin at starting block 205 and proceed to stage 210 where first AP 115 may receive a slot allocation. For example, a slot-based MAPc scheduler may schedule slots for the plurality of APs in operating environment 100.

From stage 210, where first AP 115 receives the slot allocation, method 200 may advance to stage 220 where first AP 115 may determine excess time in the slot allocation. For example, first AP 115 may be allocated a slot for its traffic, but may not need all the resources allocated. This may be because the resources were allocated for a worst case, but the worst case did not occur. In other words, more time may have been scheduled for the slot than was actually needed. Consequently AP 115 may have excess time in this slot allocation.

Once first AP 115 determines excess time in the slot allocation in stage 220, method 200 may continue to stage 230 where first AP 115 may use wireless exchanges to allocate the excess time in the slot allocation to a second AP. For example, in some embodiments, each AP may fill the excess time in the slot with its other buffered traffic. In other embodiments, the excess time in the slot may be re-farmed, after prior inter-AP wired coordination, with neighboring APs via Carrier-Sense Multiple Access with Collision Avoidance (CSMA/CA). However, latency of wired notification may often be too high, so gains made with this embodiments may be limited. Example cases where this may be helpful may comprise one or more of: i) slot times exceed 2 ms (or even 5 ms) in duration and the AP is lightly loaded; or ii) slot times exceed 50 μs (or even 200 μs) in duration and the AP Hardware/Software (Number of Spatial Streams (NSS), host subsystem, and Wi-Fi Media Access Control (MAC) subsystem) is rearchitected to provide a low latency wired path from MAC to peer MAC. The low latency wired path may have elements such as a simple-to-parse frame (e.g., no tunneling, no Internet Protocol (IP) TU—just a new EtherType), host bypass or host cut thru on Transmit (TX) and Receive (RX), and the frame sent directly onto the wire, possibly with Ethernet preemption on TX.

In yet other embodiments, the excess time in the slot may be offered for re-farming via a wireless "slotEnd" frame. For example, first AP 115 may place the slotEnd frame in the slot, but before the end of the slot allocation. This slotEnd frame may trigger the plurality of APs to contend, for example, using CSMA/CA. However, neighboring APs may need to hear the slotEnd from all neighboring slot owners. If first AP 115 can hear second AP 120 and second AP 120 can hear third AP 125, but first AP 115 and third AP 125 cannot hear each other, then first AP 115 and third AP 125 may perform spatial reuse. However, second AP 120 may need to hear slotEnd's from both first AP 115 and third AP 125 before second AP 120 knows it is safe to transmit. In this situation, the first slotEnd frame may be liable to collide with traffic that finishes later, so some times this may fail. This may be addressed by the plurality of APs transmitting slotEnd frames at regular, defined offsets that may be selected to not overlap with their neighbors. The APs may only stop transmitting them when they have heard slotEnd frames from all neighboring APs whereupon they may begin contention without fear of colliding with pre-excess slot time transmissions.

In yet other embodiments, the excess time in the slot may be offered for re-farming according to wireless Wi-Fi 7 signal protocol for example. In this embodiment the plurality of APs may contend, wireless resource may be reported using Network Allocation Vector (NAV) (e.g., where the NAV is clear), the slot-owning AP may allocate, and then the peer AP may transmit. The NAV may comprise a virtual carrier-sensing mechanism used with wireless network protocols such as IEEE 802.11 (Wi-Fi) and IEEE 802.16 (WiMax). The virtual carrier-sensing may comprise a logical abstraction that limits the need for physical carrier-sensing at the air interface in order to save power. The MAC layer frame headers contain a duration field that specifies the transmission time required for the frame, in which time the medium will be busy. The stations listening on the wireless medium read the duration field and set their NAV, which is an indicator for a station on how long it must defer from accessing the medium. The NAV may be thought of as a counter that counts down to zero at a uniform rate. When the counter is zero, the virtual carrier-sensing indication is that the medium is idle.

This embodiment may enable a hybrid wired/wireless approach, with wired allocations to allocate resources for the worst case, then wireless for when the worst case does not occur. For example, each of the plurality of APs may contend. When an AP wins the medium (e.g., second AP 120), it may poll neighboring APs to learn how much traffic they have per Access Class (AC)/Traffic Identifier (TID) and for how long the head of line traffic has been buffered (or a similar metric such as the sum of the time that the buffered frames have spent buffered). It may happen that no neighboring AP responds due to Clear Channel Assessment (CCA) busy, and then second AP 120 may transmit a short Transmit Opportunity (TXOP) within its Basic Service Set (BSS) (e.g., max (500 ms, 20% of the remaining slot) and then may re-poll its neighboring APs. Once one or more neighboring APs respond, second AP 120 may delegate the TXOP to itself or its neighboring APs via one or more of TDMA or SR in accordance with priority (e.g., highest AC buffered the longest, etc.) and how well separated the neighboring APs and their BSSs are. This process may be good for allocating medium time to the most urgent traffic, but may come with non-negligible wireless overheads (e.g., polling neighboring APs, gathering their buffer conditions, transmitting intermediate Request to Send (RTS)/Clear to Send(CTS) that might be needed for regulatory reasons etc.). Once first AP 115 use wireless exchanges to allocate the excess time in the slot allocation to a second AP in stage 230, method 200 may then end at stage 240.

Consistent with embodiments of the disclosure, when an AP is allocated a slot for its traffic, but does not need all the resources, it may use wireless exchanges to re-farmed this excess slot time. For example, embodiments of the disclosure may report the start of its excess slot to neighboring APs for them to contend for if none of their neighboring APs need the time any more. Other embodiments of the disclosure may determine if its neighboring APs have buffered traffic and allocate (e.g., some of) the remaining excess slot to one or more APs in turn (TDMA) or in parallel (SR) where the allocation is according to a priority of the buffer traffic.

Figure 3:
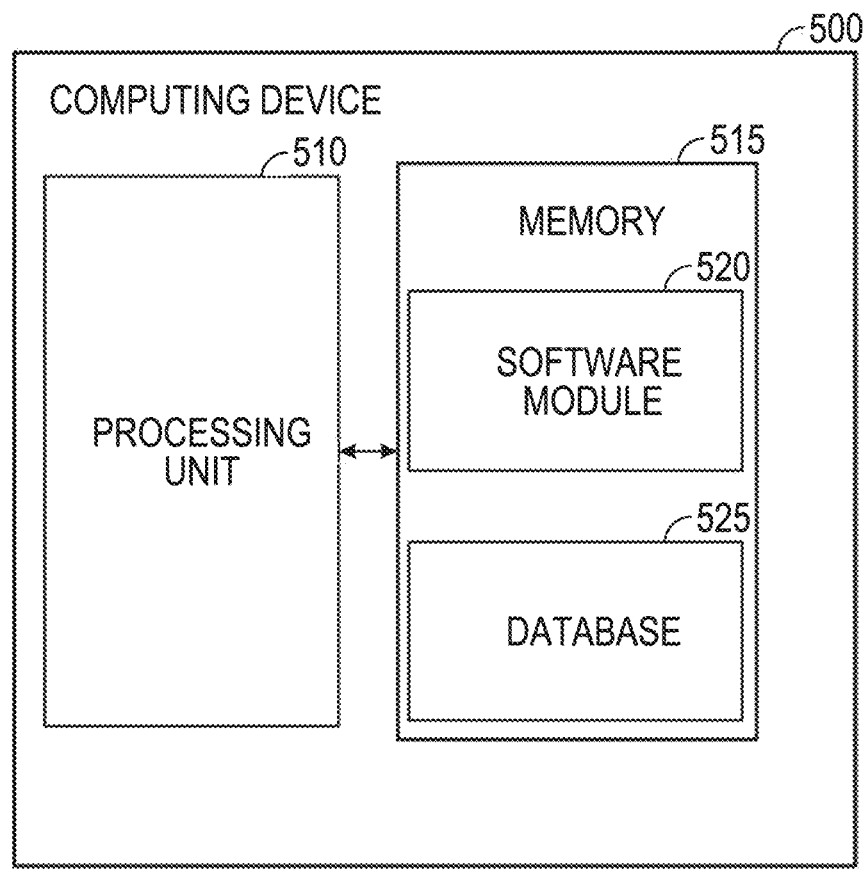
FIG. 3 is a block diagram of a computing device.

FIG. 3 shows computing device 300. As shown in FIG. 3, computing device 300 may include a processing unit 310 and a memory unit 315. Memory unit 315 may include a software module 320 and a database 325. While executing on processing unit 310, software module 320 may perform, for example, processes for providing excess slot-time re-farming as described above with respect to FIG. 2. Computing device 300, for example, may provide an operating environment for controller 105, first AP 115, second AP 120, third AP 125, first client device 130, second client device 135, or third client device 140. Controller 105, first AP 115, second AP 120, third AP 125, first client device 130, second client device 135, or third client device 140 may operate in other environments and are not limited to computing device 300.

Computing device 300 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 300 may comprise any computer operating environment, such as hand-held devices, multiprocessor systems, microprocessor-based or programmable sender electronic devices, minicomputers, mainframe computers, and the like. Computing device 300 may also be practiced in distributed computing environments where tasks are performed by remote processing devices. The aforementioned systems and devices are examples, and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 300 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   receiving, by a first Access Point (AP), a slot allocation;
   determining excess time in the slot allocation; and
   using wireless exchanges to allocate the excess time in the slot allocation to a second AP, wherein using the wireless exchanges to allocate the excess time in the slot allocation to the second AP comprises:
   providing a slotend frame at a pre-determined offset in the slot allocation, wherein the slotend frame indicates an end and causes other APs to contend for the excess time in the slot allocation,
   transmitting by each of the other APs the slotend frame at the pre-defined offset, wherein the other APs only stop transmitting when they have heard slotend frames from all of the other APs, and
   contending, by the other APs, for the excess time after stopping the transmitting.

2. The method of claim 1, wherein the second AP comprises one of the other APs.

3. The method of claim 1, wherein using wireless exchanges to allocate the excess time in the slot allocation to a second AP comprises using Network Allocation Vector (NAV) to indicate an end.

4. The method of claim 3, wherein using the NAV to indicate the end causes other APs to contend for the excess time in the slot allocation wherein the second AP comprises one of the other APs.

5. The method of claim 4, wherein using wireless exchanges to allocate the excess time in the slot allocation comprises using wireless exchanges to allocate the excess time in the slot allocation based on priority of buffered traffic.

6. The method of claim 4, wherein using wireless exchanges to allocate the excess time in the slot allocation comprises using wireless exchanges to allocate the excess time in the slot allocation based on priority of buffered traffic and in one of in turn and in parallel.

7. A system comprising:
   a memory storage; and
   a processing unit coupled to the memory storage, wherein the processing unit is configured to:
   receive a slot allocation;
   determine excess time in the slot allocation; and
   use wireless exchanges to allocate the excess time in the slot allocation to a second AP, wherein the processing unit being configured to use the wireless exchanges to allocate the excess time in the slot allocation to the second AP comprises the processing unit being configured to:
   provide a slotend frame at a pre-determined offset in the slot allocation that indicates an end and causes other APs to contend for the excess time in the slot allocation,
   transmit by each of the other APs the slotend frame at the pre-defined offset, wherein the other APs only stop transmitting when they have heard slotend frames from all of the other APs, and
   contend, by the other APs, for the excess time after stopping the transmitting.

8. The system of claim 7, wherein the second AP comprises one of the other APs.

9. The system of claim 7, wherein using wireless exchanges to allocate the excess time in the slot allocation to a second AP comprises using Network Allocation Vector (NAV) to indicate an end.

10. The system of claim 9, wherein using the NAV to indicate the end causes other APs to contend for the excess time in the slot allocation wherein the second AP comprises one of the other APs.

11. The system of claim 10, wherein using wireless exchanges to allocate the excess time in the slot allocation comprises using wireless exchanges to allocate the excess time in the slot allocation based on priority of buffered traffic.

12. The system of claim 10, wherein using wireless exchanges to allocate the excess time in the slot allocation comprises using wireless exchanges to allocate the excess time in the slot allocation based on priority of buffered traffic and in one of in turn and in parallel.

13. A non-transitory computer-readable medium that stores a set of instructions which when executed perform a method executed by the set of instructions comprising:
   receiving, by a first Access Point (AP), a slot allocation;
   determining excess time in the slot allocation; and
   using wireless exchanges to allocate the excess time in the slot allocation to a second AP, wherein using the wireless exchanges to allocate the excess time in the slot allocation to the second AP comprises:
   providing a slotend frame at a pre-determined offset in the slot allocation that indicates an end and causes other APs to contend for the excess time in the slot allocation,
   transmitting by each of the other APs the slotend frame at the pre-defined offset, wherein the other APs only stop transmitting when they have heard slotend frames from all of the other APs, and
   contending, by the other APs, for the excess time after stopping the transmitting.

14. The non-transitory computer-readable medium of claim 13, wherein the second AP comprises one of the other APs.

15. The non-transitory computer-readable medium of claim 13, wherein using wireless exchanges to allocate the excess time in the slot allocation to a second AP comprises using Network Allocation Vector (NAV) to indicate an end.

16. The non-transitory computer-readable medium of claim 15, wherein using the NAV to indicate the end causes other APs to contend for the excess time in the slot allocation wherein the second AP comprises one of the other APs.

17. The non-transitory computer-readable medium of claim 16, wherein using wireless exchanges to allocate the excess time in the slot allocation comprises using wireless exchanges to allocate the excess time in the slot allocation based on priority of buffered traffic.

18. The method of claim 1, wherein using the wireless exchanges to allocate the excess time in the slot allocation to the second AP comprises using the wireless exchanges to allocate the excess time in the slot allocation to the second AP after prior inter-AP wired coordination with the other APs via Carrier-Sense Multiple Access with Collision Avoidance (CSMA/CA).

19. The method of claim 1, wherein the inter-AP wired coordination with the other APs via CSMA/CA comprises one of the following:
  determining that the excess time is greater than a predetermined value; and
  determining that a wired connection to the other APs is rearchitected to provide a low latency wired path from a Media Access Control (MAC) to a peer MAC.

20. The method of claim 1, wherein using the wireless exchanges to allocate the excess time in the slot allocation to the second AP comprises:
  polling neighboring APs to determining how much traffic they have per Access Class (AC)/Traffic Identifier (TID) and for how long a head of line traffic has been buffered; and
  in response to receiving no response to the polling, transmitting a predetermined fraction of Transmit Opportunity (TXOP) within its Basic Service Set (BSS); and
  re-polling the neighboring APs.

* * * * *